(12) United States Patent
Crickmore et al.

(10) Patent No.: US 8,564,786 B2
(45) Date of Patent: Oct. 22, 2013

(54) PHASE BASED SENSING

(75) Inventors: Roger Ian Crickmore, Dorset (GB); Jolyon DeFreitas, Dorset (GB)

(73) Assignee: Optasense Holdings Ltd. (GB)

( * ) Notice: Subject to any disclaimer, the term of this patent is extended or adjusted under 35 U.S.C. 154(b) by 528 days.

(21) Appl. No.: 12/529,291

(22) PCT Filed: Mar. 10, 2008

(86) PCT No.: PCT/GB2008/000830
§ 371 (c)(1),
(2), (4) Date: Aug. 31, 2009

(87) PCT Pub. No.: WO2008/110780
PCT Pub. Date: Sep. 18, 2008

(65) Prior Publication Data
US 2010/0067018 A1    Mar. 18, 2010

(30) Foreign Application Priority Data
Mar. 14, 2007   (GB) .................................. 0705240.0

(51) Int. Cl.
*G01B 9/02*    (2006.01)

(52) U.S. Cl.
USPC ........................................................ 356/477

(58) Field of Classification Search
USPC ................... 356/477, 478, 484, 480
See application file for complete search history.

(56) References Cited

U.S. PATENT DOCUMENTS

| | | | |
|---|---|---|---|
| 4,121,155 A | 10/1978 | Chamuel | |
| 4,231,260 A | 11/1980 | Chamuel | |
| 4,649,529 A | 3/1987 | Avicola | |
| 4,697,926 A | 10/1987 | Youngquist et al. | |
| 4,699,513 A | 10/1987 | Brooks et al. | |
| 4,770,535 A | 9/1988 | Kim et al. | |
| 4,848,906 A | 7/1989 | Layton | |
| 4,885,462 A | 12/1989 | Dakin | |
| 4,947,037 A | 8/1990 | Nash et al. | |
| 5,140,154 A * | 8/1992 | Yurek et al. ............. | 250/227.12 |
| 5,412,474 A | 5/1995 | Reasenberg et al. | |
| 5,680,489 A * | 10/1997 | Kersey .......................... | 385/12 |
| 5,787,053 A | 7/1998 | Ames et al. | |

(Continued)

FOREIGN PATENT DOCUMENTS

| | | |
|---|---|---|
| GB | 2442745 | 4/2008 |
| WO | WO 87/06690 | 11/1987 |

(Continued)

*Primary Examiner* — Michael A Lyons
*Assistant Examiner* — Jonathan Hansen
(74) *Attorney, Agent, or Firm* — McDonnell Boehnen Hulbert & Berghoff LLP

(57) ABSTRACT

Interrogation of a phase based transducer is performed by comparing the state of the transducer at two points in time to determine the rate of change with time of the measurand represented as a phase change. The rate of change, or derivative of the phase change typically has a much smaller amplitude than the signal itself, and the derivative measurement can therefore be thought of as a low sensitivity measurement to be used instead of or in combination with the normal signal measurement having higher sensitivity. In this way, large amplitude signals which might otherwise be subject to overscaling effects can be measured more effectively. For a signal with the majority of its energy centered at approximately 800 Hz, for example, the derivative of that signal will typically be attenuated by 60 dB with a period between the two measurement times of 200 ns.

27 Claims, 7 Drawing Sheets

(56) References Cited

U.S. PATENT DOCUMENTS

| | | |
|---|---|---|
| 6,449,046 B1 | 9/2002 | Huang et al. |
| 6,466,706 B1 | 10/2002 | Go et al. |
| 6,522,797 B1 * | 2/2003 | Siems et al. ............... 385/12 |
| 6,591,025 B1 | 7/2003 | Siems et al. |
| 6,785,004 B2 * | 8/2004 | Kersey et al. ............ 356/478 |
| 7,072,566 B2 | 7/2006 | Seo et al. |
| 7,119,325 B2 * | 10/2006 | Pieterse et al. .......... 250/227.14 |
| 7,424,191 B2 | 9/2008 | Tadakuma et al. |
| 7,869,014 B2 | 1/2011 | Tadakuma et al. |
| 2005/0078316 A1 * | 4/2005 | Ronnekleiv et al. ...... 356/478 |
| 2007/0024857 A1 | 2/2007 | Menezo |
| 2007/0041020 A1 * | 2/2007 | Hall ........................ 356/484 |
| 2007/0097376 A1 | 5/2007 | Courville et al. |
| 2007/0097377 A1 | 5/2007 | Courville et al. |
| 2008/0277568 A1 | 11/2008 | Crickmore et al. |
| 2008/0291461 A1 | 11/2008 | Waagaard et al. |
| 2011/0149295 A1 * | 6/2011 | Crickmore ................ 356/477 |

FOREIGN PATENT DOCUMENTS

| | | |
|---|---|---|
| WO | WO 00/12977 | 3/2000 |
| WO | WO 2006/048647 | 5/2006 |
| WO | WO 2007/021287 | 2/2007 |
| WO | WO 2008/110780 | 9/2008 |
| WO | WO 2010/004249 | 1/2010 |

* cited by examiner

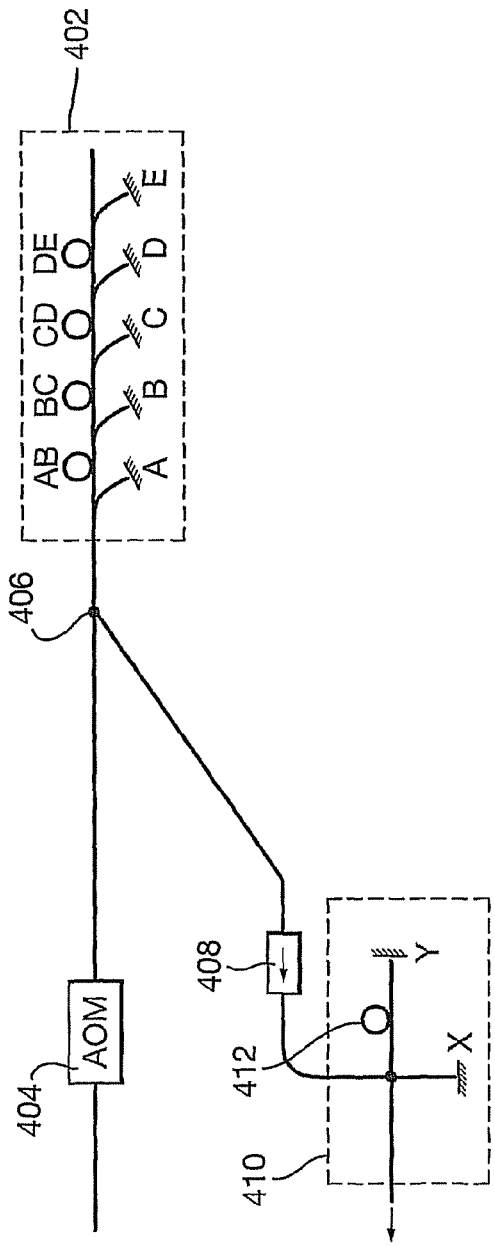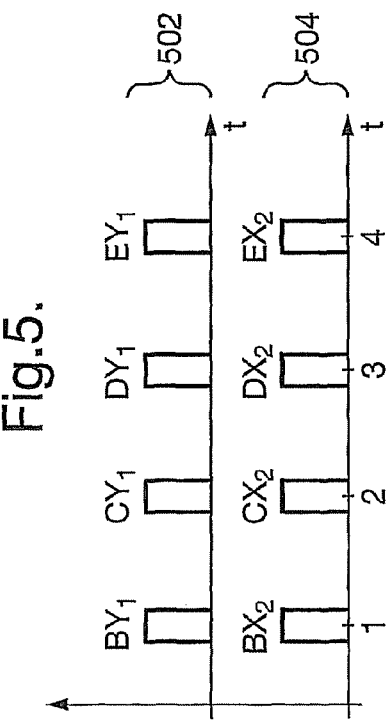

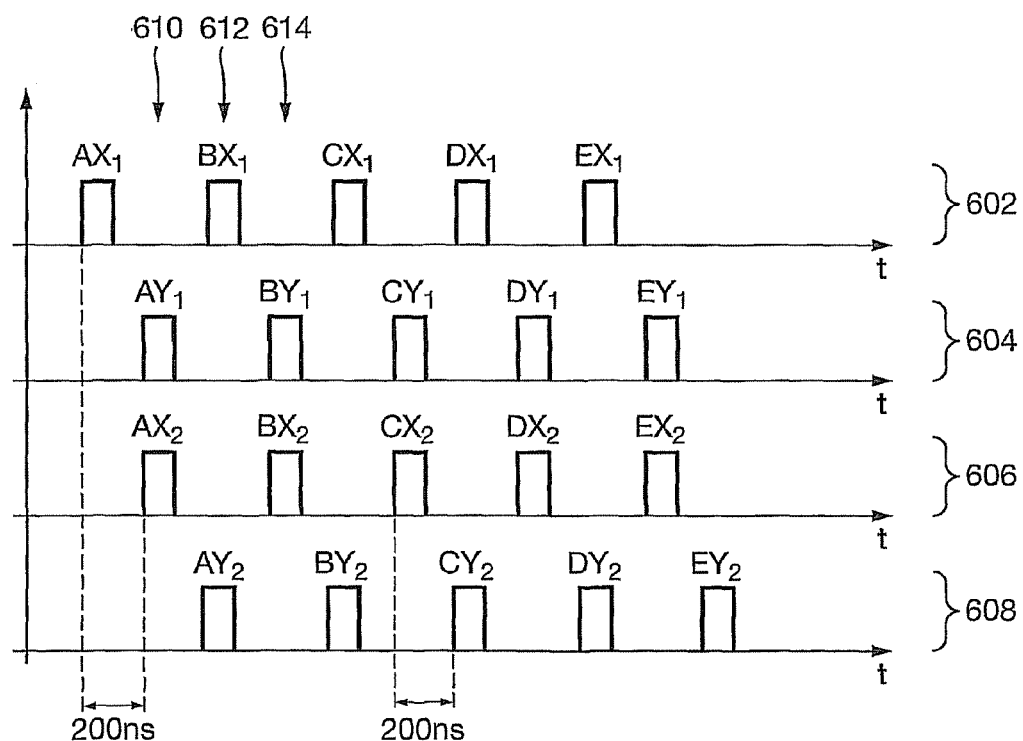

PHASE BASED SENSING

BACKGROUND OF THE INVENTION (1) Field of the Invention

The present invention relates to sensors which exploit a change in phase of an interrogation signal to determine a sensed parameter, and particularly, but not exclusively to fibre optic interferometric sensing. The present invention finds particular application in the filed of seismic surveying.

(2) Description of the Art

Fibre optic sensors employ a length of optic fibre arranged in such a way that a sensed parameter causes a strain to be imposed on the fibre. Typically the fibre is arranged in a coil, although other arrangements are possible. Such strain causes a change in phase of optical signal propagation in that fibre, which change can be detected by interferometric techniques. A variety of different arrangements for this type of transducer have previously been proposed, many of which have the coil of optic fibre wound on a deformable core or mandrel, which undergoes radial expansion or contraction in response to the sensed parameter, such as sensed vibration.

Such fibre optic sensors can exhibit extremely high sensitivities, and have the advantage of being completely passive, employing no power at the sensing transducer. Such sensors have also proved popular in applications where large arrays of sensors are required, on account of the relative ease with which they can be multiplexed.

An example of such an application is seismic surveying in the oil and gas exploration industry, where large time multiplexed arrays comprising hundreds or even thousands of vibration sensors and/or hydrophones can be used to sense reflections of an incident pulse from geological formations beneath the sea bed. Sampling such an array at regular periods provides 3D time lapsed data on existing or potential new reserves.

A problem experienced with this approach to sensing is that, for a given sampling rate, signals above a certain amplitude threshold cause the phase based sensed information to become distorted, and can cause failure of the demodulation process. This effect, commonly referred to as overloading or overscaling is dependent on the frequency of the measured signal. In seismic systems this can cause a particular problem with the direct arrival of the incident pulse, especially when that pulse has been generated close to the sensors (usually by an airgun towed from a surface vessel as it passes over the array). It is desirable to be able to record this incident pulse without the distortion that overscale can produce.

SUMMARY OF THE INVENTION

It is therefore an object of the present invention to provide improved sensing methods and apparatus.

According to a first aspect of the present invention there is provided a method of interrogating a phase based transducer, said transducer providing a change in phase of signal propagation in response to a sensed parameter, said method comprising receiving a signal propagated through said transducer, comparing the signal at a point representing the state of the transducer at a first time, and at a point representing the state of the transducer at a second time, and determining from said comparison a measure of the rate of change of phase with time of said signal.

The rate of change, or derivative of the phase change typically has a much smaller amplitude than the signal itself since the difference between the two times at which the signal is measured will usually be much less than the period of the signal being measured. Thus even if the transducer experiences a stimulus which causes the normal signal to overscale, the derivative signal is likely to be unaffected. The derivative signal or measurement can therefore be thought of as a low sensitivity measurement, which can be obtained severally and independently, to be used instead of or in combination with the normal signal measurement having higher sensitivity. For a signal with the majority of its energy centred at approximately 800 Hz, for example, the derivative of that signal will typically be attenuated by 60 dB with a period between the two measurement times of 200 ns.

In one embodiment, comparing the signal comprises combining a delayed version and an undelayed version of the received signal, preferably using an output interferometer. Alternatively the signal could be sampled at multiple different times and an algorithmic or signal processing approach employed to determine the derivative of the sensed parameter.

The actual value of the sensed parameter can be reconstructed by integrating the measured derivative value. However, if the noise floor is determined by system noise, then the noise floor is substantially the same for both the phase information and its derivative, the derivative signal suffers from a lower SNR. Considering then that overscaling may only occur infrequently in response to certain high amplitude inputs, such as the first break of an airgun used in geophysical surveying, it is beneficial in certain embodiments to measure both the derivative, and the actual value of the sensed parameter directly. Examples of such embodiments are described below and it will be appreciated that an adaptive system could be employed which measures the signal directly in a default state, and reverts to a signal integrated from a derivative measurement on detecting an overscale condition. For example, it would be possible to use a threshold value for the amplitude of the derivative signal to identify periods in which the normal signal was overloaded.

It has been found however, that by careful consideration of overscaling and its effect on the phase information produced by the transducer, that during overscaling, although a direct measurement of the phase value representative of the sensed parameter may be distorted, such a phase value can be used in conjunction with the derivative signal to produce a re-constructed value. In certain embodiments therefore a measure of phase from said received signal is derived in addition to the measure of the rate of change of phase. In particular embodiments the two measures (phase, and rate of change of phase) are obtained severally, in that each can be obtained without recourse to the other, and can be obtained substantially simultaneously.

As will be described below in greater detail, overloading occurs when the instantaneous frequency of the output of the transducer (which depends on the rate of change of phase) falls outside of the Nyquist frequency range determined by the rate at which this signal is sampled. Any instantaneous frequency that falls outside the Nyquist range will be folded about the limits of the range back into it. Depending on the amplitude and frequency of the sensed signal, the information may be folded or wrapped about the Nyquist frequency limits multiple times. The present inventors have found that the derivative information measured in embodiments of the present information can be used to determine how many times the information has been wrapped, or the factor by which the information exceeds the Nyquist limit. This then allows the directly measured parameter value to be corrected to provide a signal having an improved SNR to that provided by integrating the measured derivative signal.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which:

FIG. 4 shows a system for interrogating a fibre optic package according to an aspect of the invention;

FIG. 5 illustrates an output obtainable from the system of FIG. 4;

FIG. 6 shows a further output obtainable from the system of FIG. 4;

DESCRIPTION OF THE INVENTION

Figure 1:
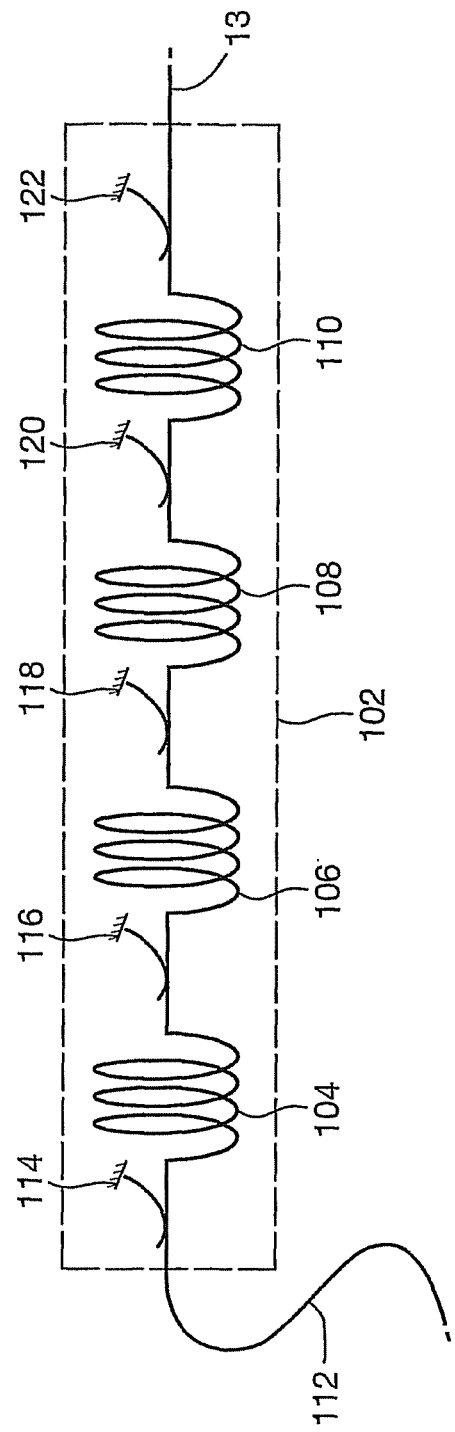
FIG. 1 shows a known type of fibre optic sensor package.

Referring to FIG. 1, there is shown schematically a known type of fibre-optic sensor package, indicated generally 102, comprising four individual fibre-optic sensing coils 104, 106, 108, 110 formed from a single length of optical fibre 13, and arranged in series. A portion of the optical fibre 112 serves as the package input/output (i/o) fibre. Fibre-coupled mirrors 114, 116, 118, 120, 122 are coupled to the optical fibre 13 at respective locations along it such that each of the coils has a fibre-coupled-mirror coupled at each end of it. Other means of reflecting a portion of light from before and after each sensor such as in fibre Bragg gratings could be used instead of the fibre coupled mirrors. In practice for example, three of the coils could be arranged to form three orthogonal fibre optic accelerometers, with the fourth coil forming part of a hydrophone to form a four-component package suitable for seismic surveying applications. The physical arrangement of the coil in each transducer is not material to the present invention, and is not discussed here, however a range of possible arrangements will be known to the skilled reader. A large scale array of such packages can be coupled together, and interrogated periodically using multiplexing to provide time lapsed seismic imagery for example.

Figure 2:
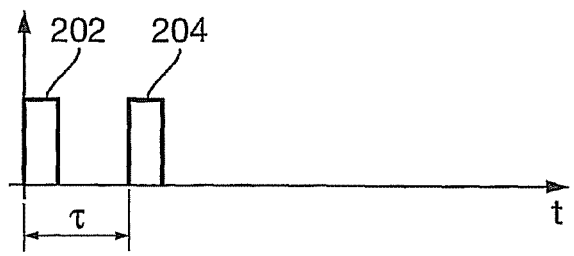
FIG. 2 is an interrogating waveform suitable for the package of FIG. 1.

Referring to FIG. 2, an interrogation of the package 102 of FIG. 1 may be carried out by introducing a pair of interrogating optical pulses 202, 204 into the package i/o fibre 112. Pulses 202, 204 have respective frequencies $\omega_1$, $\omega_2$ and pulse 202 is delayed by $\tau=2L/c$ with respect to pulse 20, L being the length of coil in the sensor and c being the speed of an optical pulse in the fibre.

Figure 3A:
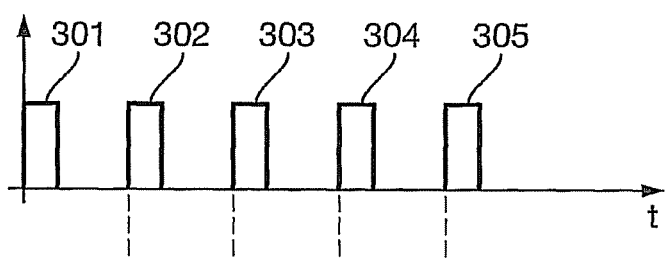
FIG. 3 illustrates a typical response from a package of the type shown in FIG. 1.
Figure 3B:
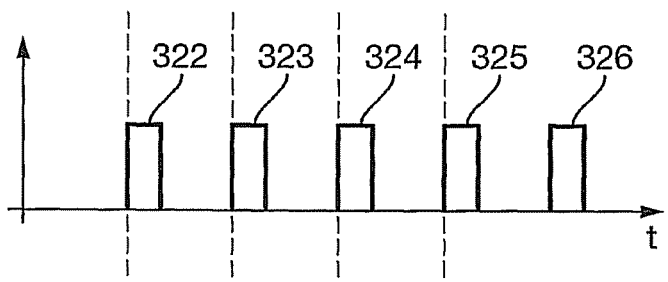
Figure 3C:
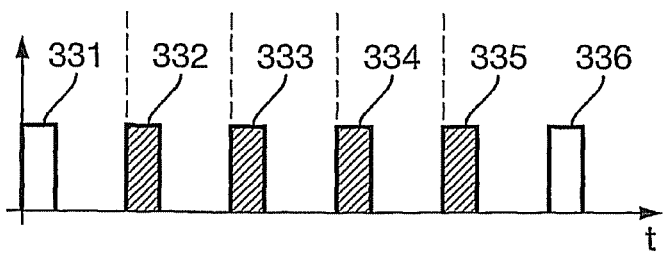

FIG. 3 illustrates the optical output response of the package by considering the output formed by each of the pair of input pulses. In FIG. 3a the first pulse 202 to arrive at the package is reflected off each of the 5 fibre-coupled mirrors to produce five output pulses 301, 302, 303, 304 and 305, measured relative to an arbitrary time reference. Similarly, looking at FIG. 3b, pulse 204 produces five time delayed output pulses 322, 323, 324, 325 and 326 relative to the same arbitrary time reference. Because the input pulses are delayed by twice the time of flight through a single coil, and because the pulses exist on the same fibre, the two sets of outputs are superposed to produce six pulses 331, 332, 333, 334, 335 and 336 shown in FIG. 3c. Pulses 331 and 336 represent only a single reflection of a single pulse, however it will be understood that pulses 332 to 335 (shown shaded) each correspond to the combination of two pulses reflected by adjacent fibre coupled mirrors. It will be understood that these pulses therefore represent the combination of a pulse which has passed (twice) through the coil between the two adjacent mirrors, and a pulse which has not. Phase detection can therefore be used to determine the phase change imposed by that coil, and hence a measure of the sensed parameter is obtained as is known in the art.

If $\phi(t)$ is the sensed parameter, then the signal obtained from a photodetector used to measure a series of pulses returning from a sensor of the type described above can be written as $\cos(\omega_c t+\phi(t))$ i.e. the sensed information is represented as a phase change superimposed on a carrier signal of frequency $\omega_c$. Techniques that are well known to those skilled in the art can then be used to demodulate the phase signal from the carrier. The carrier frequency is typically chosen to be half of the Nyquist frequency, which is in turn half of the sampling frequency. It is usual for one sample to be made in each returning optical pulse and so the sampling frequency is the rate at which pulse pairs are transmitted into the array. By way of an example, the sampling frequency could be approximately 320 KHz, giving a Nyquist frequency of approximately 160 KHz and a carrier frequency of approximately 80 KHz. The sampling frequency will typically have a practical upper limit dependent upon the type and arrangement of sensor or sensors, amongst other factors.

An overscale condition occurs when the instantaneous frequency of the phase modulated carrier falls outside the Nyquist band i.e. when $$\frac{d\varphi(t)}{dt} \geq \omega_N - \omega_c$$

or when $$\frac{d\varphi(t)}{dt} \leq -\omega_c,$$

where $\omega_N$ and $\omega_c$ are the Nyquist and carrier frequencies respectively. In practice this results in aliasing of instantaneous frequency back into the Nyquist band by folding or wrapping around one of its limits in frequency space. Depending on the magnitude and frequency of the sensed parameter, the instantaneous frequency can be wrapped back multiple times. If the sensed parameter is modelled approximately as $\phi(t)=\phi_0 \cos \omega_m t$, then the condition for overscale not occurring, for the usual condition of $\omega_N=2\omega_c$ is sometimes expressed as $$\varphi_0 \leq \frac{\omega_c}{\omega_m}.$$

Referring now to FIG. 4, there is shown a sensor package 402, substantially as illustrated in FIG. 1. The package is interrogated by a pair of pulses produced by acousto-optic modulator 404.

The output series of pulses is tapped off at junction 406, passed through an isolator 408, and to output interferometer designated by 410. In the scheme of FIG. 4, the delay between input pulses need not be twice the time of flight of light through a sensing coil of package 402, but is instead arranged to be twice the time of flight of light through delay coil 412 of the output interferometer. While the described embodiment employs a Michelson interferometer, the skilled reader would recognise that a Mach-Zehnder type interferometer with a delay coil in one of the arms could equally be used. In this case, arranging for the separation between the input pulses to be just the time of flight through the delay coil in one arm of the interferometer would allow equivalent measurements to be made.

FIG. 5 illustrates component pulse trains output from interferometer 410. Pulse train 502 represents the output of the leading input pulse (designated by subscript 1) from mirrors B to E, resulting from the delay arm of the interferometer (designated Y). Pulse train 504 represents the output from the lagging input pulse (designated by subscript 2) from mirrors B to E, resulting from the undelayed arm of the interferometer (designated X). It can be seen that, in this way, interferometer 410 temporally aligns and interferes pairs of pulses, both of which have passed through the same sensing coil(s) of package 402, but at different times (as indicated by the differing subscripts of temporally aligned pulses). In other words, each pulse reflected off fibre coupled mirrors B to E (pulses reflected off mirror A have not passed through a sensing coil), and gathering information on the associated sensing coil, is combined with a pulse having undergone the same optical path, gathering the same information, but at a later time. The output of the interferometer therefore represents the derivative of the phase value, in contrast to the actual value of phase which would usually be measured directly in the prior art arrangements of FIGS. 1 to 3. Thus using the terminology above, if the signal returned from the transducer is $\cos(\omega_c t + \phi(t))$ with $\phi(t)$ being a measure of the sensed parameter, the system depicted in FIG. 5 derives a value representative of $$\frac{d\varphi(t)}{dt},$$

or the instantaneous frequency of the returned signal.

Considering the combined output pulse centred at t=1, it will be understood that this represents the combination of two pulse having been reflected from mirror B, ie having passed through sensing loop AB, at two different times. The derivative of the parameter sensed by coil AB is therefore contained within and can be determined from this pulse. In a similar way, the pulse output from the interferometer at t=2 will be a combination of pulses, both of which have made double passes of sensing loops AB and BC. Once the derivative value is extracted from this pulse then, by subtracting the derivative value of sensing loop AB (obtained above) the derivative value of sensing loop BC is obtained. In this way, the derivative values for each of the sensing loops in package 402 can be obtained.

It is noted that the reflection from fibre coupled mirror A is not affected by the derivative, or rate of change of phase of any of the sensing loops of the arrangement explained above with respect to FIGS. 4 and 5. However the pulses reflected off mirror B (t=1) actually contain a signal that is the combination of the derivative of the phase modulation in coil AB and any of the downlead fibres (i.e. fibre between coupler 406 and the AOM 404, between the coupler 406 and reflector A, and between the coupler 406 and the photodetector on the output of interferometer 410). In some applications the downlead fibre can be many kilometers long and so signal that its pickups up due to ambient noise can be significant. If the derivative signal from reflector A is measured and then subtracted from the signal from reflector B it will remove any signal from the downlead from that obtained for coil AB.

Turning to FIG. 6, there are illustrated component pulse trains representing the output components of a particularly preferred sensor interrogation arrangement. The sensor arrangement is substantially the same as that of FIG. 4, but with each sensor coil arranged to be twice the length of the delay coil of the interferometer. In one example, each sensor coil is 40 m in length, the interferometer delay coil is 20 m long, and the delay between the input pulse pair is approximately 200 ns.

It can be seen that pulse trains 604 and 606 are substantially the same as trains 502 and 504 of FIG. 5, that is, they represent the derivative or 'low sensitivity' information for each sensor coil (cumulatively). The output pulse at the time point indicated by 610 is caused by reflections off mirror A and carries no sensed derivative information (except that picked up by the downlead) and is omitted from FIG. 5 to improve clarity. The output equivalent to that indicated at 614 of FIG. 6 is the first considered pulse of FIG. 5. Another benefit of mirror A however can be seen by considering pulse trains 602 and 608 which result respectively from reflections of the first pulse via mirror X in the output interferometer (FIG. 4, 410) and reflections of the second pulse from mirror Y in said interferometer. These are essentially of the same form as shown in FIG. 3, and combine to form output pulses carrying the direct parameter values, each pair of pulses representing a reflection from adjacent mirrors. For example, the output pulse at time 612 will be a combination of the leading input pulse reflection from mirror B and the lagging input pulse reflection from mirror A, and therefore contains direct, or 'high sensitivity' information sensed by coil AB which can be extracted directly in the known fashion. The fact that the two pulses have passed through different arms of interferometer 410 does not substantially affect the information contained within the pulse.

Therefore, in the arrangement described, both directly sensed (high sensitivity) values and derivative (low sensitivity) values can be obtained independently from interleaved sets of output pulses, resulting from the same input pulse pair. It can be seen that in the example of FIG. 6, this is achieved by arranging for the input pulse separation to be approximately half of that which is used for the interrogation of a given sensor package in the way described with reference to FIG. 3.

Figure 7:
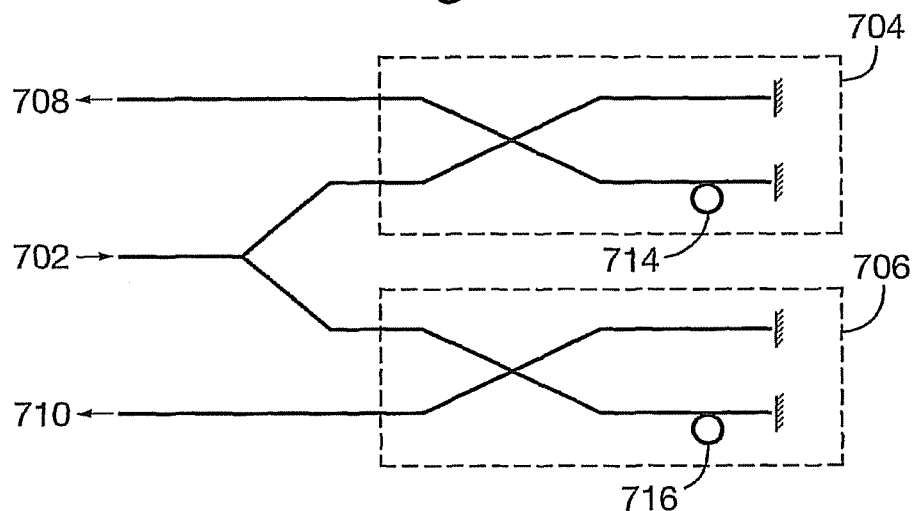
FIG. 7 illustrates an arrangement where two output interferometers are used.

FIG. 7 illustrates an alternative arrangement for the output or readout interferometer 410 of FIG. 4. The response 702 from a package of sensors generated by an interrogation signal is split and passed to two interferometers 704 and 706. In use, the interrogation signal is similar in form to that of FIG. 2, but here the two pulses have a delay equal to the total time of flight through the sensor package, so that output pulse trains resulting from each of the interrogation pulses are not interleaved. With four sensing coils in a package, each coil having a length of 40 m, a delay of 2 µs between interrogating pulses could be used for example. The delay loop 714 of interferometer 704 has a value equal to the delay of the interrogating pulses, while the delay loop 716 in interferometer 706 has a value less than the delay of 714, by a double pass through one sensor.

Figure 8:
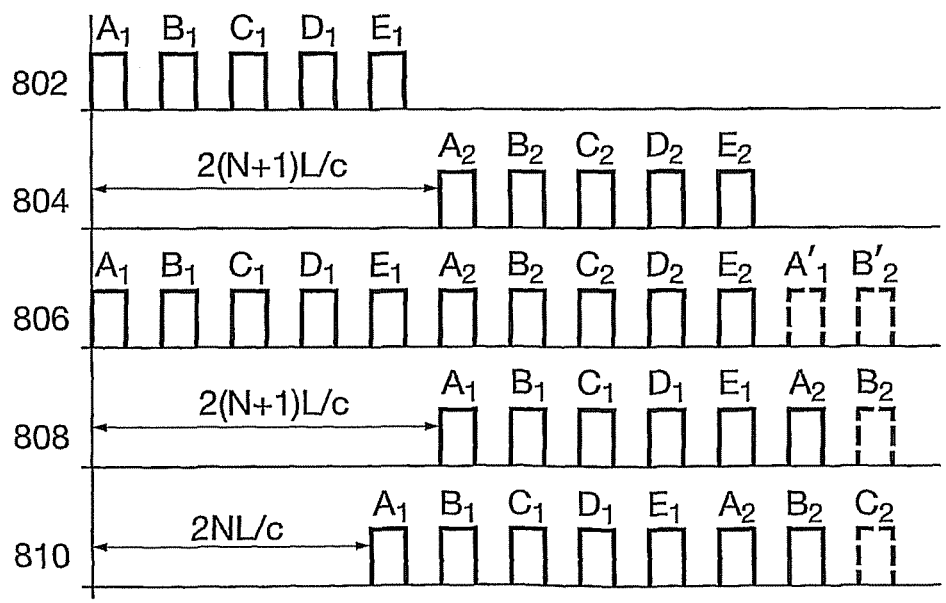
FIG. 8 shows the output obtainable from the system in FIG. 7.

The operation of the arrangement of FIG. 7 will now be described with reference to FIG. 8. The series of pulses returning from the package as a result of the first input pulse are shown at 802. The equivalent series resulting from the second input pulse are shown at 804. Because of the delay of 2(N+1)L/c (where N=number of sensors in a package, L=length of a single sensor, c=speed of flight through sensor) between input pulses, the series 802 and 804 are not interleaved, and combine in the i/o fibre of the sensor package as shown at 806, and it is this signal which is received at 702 of FIG. 7. The first interferometer 704 of FIG. 7 has a delay equal to the input pulse delay, and therefore the signal returning from the delay arm of that interferometer is shown at 808. It will be understood that the signal 708 of FIG. 7 will be a combination of signals 806 and 808, each pulse being made up of two pulses having been reflected off the same mirror in the sensor package, but at different points in time denoted by subscripts 1 and 2 in FIG. 8, and which correspond to first and second pulses respectively. A detector receiving signal 708 can therefore derive derivative phase or instantaneous frequency measures, as explained above.

Interferometer 706 of FIG. 7 has a delay of 2 NL/c, and therefore the signal returning from the delay arm of that interferometer is shown at 810. Signal 710 of FIG. 7 is therefore a combination of signals 806 and 810, with each pulse being made up of two pulses having been reflected off adjacent mirrors of the sensor package. A detector receiving signal 710 can therefore obtain direct measurements of the phase imposed by the sensor coils, as explained above.

It will be noted that the component pulses making up signals 708 and 710 will have passed through the sensor package with a greater time separation than in previously described embodiments. This results in the derivative signal being more sensitive than for a shorter input pulse separation. For a 2 µs input pulse delay, approximately 10 times more phase is accumulated over the derivative sampling time than if a 200 ns delay had been employed. Considering the 'direct' measurement of phase, since the two samples being combined in interferometer 706 represent instances at the sensor having a relatively large time separation, then the measure of the derivative of phase obtained from interferometer 704 can be used to provide a correction if necessary.

In the embodiment of FIG. 4, since only one interferometer output is employed, both 'derivative' and 'direct phase' signals appear on the same pulse train thereby using up twice as many time slots as that described in the prior art of FIGS. 1-3. By deriving the two sets of measurements (phase and derivative) independently, using two interferometers, restoration of substantially the full time domain bandwidth is achieved.

Figure 9:
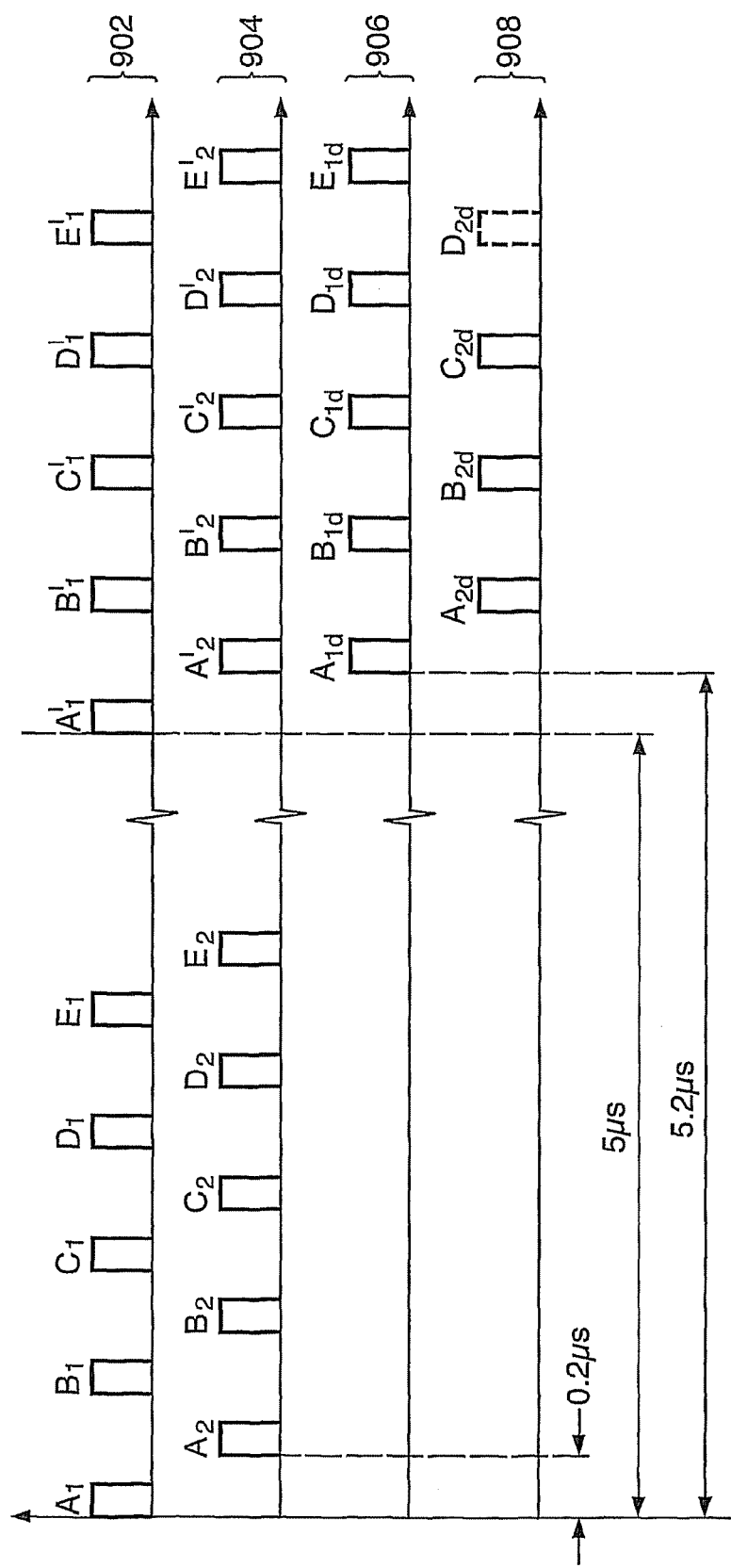
FIG. 9 illustrates multiple sampling points on a pulse of the type shown in FIG. 3.

An alternative method to achieve an increase in the time separation between the pulses that generate the derivative signal is to keep the pulse separation at 200 ns but then mix reflections that were from different transmitted pulse pairs. In such an embodiment the time separation between respective pairs of pulses is determined by the length of fibre in the sensors in one segment of the array, but a value of around 5 µs would be typical. FIG. 9 shows the pulse pattern that would be achieved using the same arrangement as in FIG. 4 but with the coil 412 causing a delay of 5.2 µs. Pulse sequences 902, 904 result from the reflections of the first and second transmitted pulses respectively, while sequences 906 and 908 are those from the first and second pulses respectively that have passed through the delay coil of the interferometer. Reflections in sequences 906 and 908 overlap with reflections in sequences 902 and 904 which were from the subsequent pulse pair.

Since the delay imposed by the delay coil (5.2 µs) is 200 ns longer than the time separation between pulse pairs, the combination of pulses takes the same general form as if the delay imposed by the coil had been 200 ns (as per FIG. 6) and so both normal and derivative signals are can be obtained from interleaved output pulses. In this case though, the pulses that combine to form the derivative signals pass through each sensor 5.2 µs apart and so the signal generated will be 26 times longer than if a 200 ns delay coil was used.

It can be shown that it is possible (in the embodiment described above) to use any delay time of the form $[5N_R+2(N_D+1)0.2]$ µs, where the 5 µs is the time between pulse pairs and $N_R$ is a positive integer. The number 0.2 corresponds to the time in µs between pulses in a pair and is dictated by the sensor length. $N_D$ is also a positive integer. The derivative of a time varying signal will tend to be proportional to the frequency of the signal. Actual interferometer response observes this relationship at low frequencies, but tails off slightly at high frequencies. In the low frequency range of approximately 0-250 Hz (useful in seismic applications), the amplitude of the derivative signal can therefore be correspondingly low, and can suffer from low SNR. Using a longer delay however causes the interferometer sensitivity to be greatly increased, and to produce correspondingly increased output amplitudes.

Although the arrangement shown in FIG. 9 does give a normal signal the large pulse delays may cause an increase in cross talk between different sensors and may increase the system noise level. These issues could be overcome by using the arrangement shown in FIG. 7 and having the two interferometers 704 and 706 causing delays of 200 ns and 5.2 µs respectively. Thus interferometer 704 could be used to produce the normal signals, and if required short separation derivative signals, while interferometer 706 could be used to produce the longer separation derivative signals.

Figure 10:
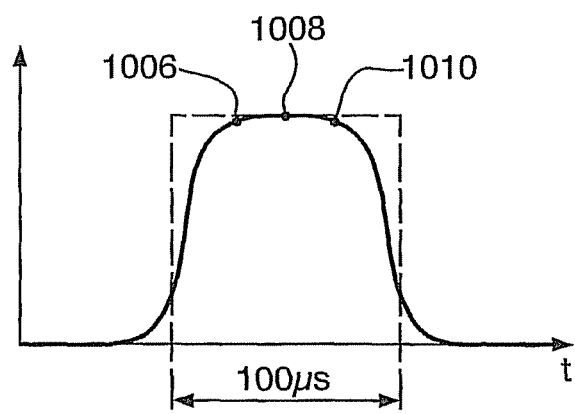
FIGS. 10 and 11 show time separations between samples on the same and different pulses.

Referring to FIG. 10, there is shown in greater detail the profile of a pulse of the type shown in FIG. 3c, that is a pulse which represents the interference of a two pulses reflected from adjacent mirrors of a sensor package, and containing phase information on the parameter sensed by the coil located between those two mirrors (as opposed to its derivative). As noted above, this information is susceptible to being 'lost' when overscaling occurs. It has been appreciated by the present inventors however, that whereas previously a sample of the optical signal of such a pulse has been taken only once, it is possible to make two or more such measurements within each pulse. Using the sampled values, a two point phase algorithm, for example, can be employed to obtain a measure of the derivative of the phase information.

The pulse of FIG. 10, as represented by the idealised square wave profile shown dashed line, is nominally 100 ns in duration. As shown by the solid line however, the actual form of the pulse includes non-zero rise and fall times, and might typically result in a plateau of 90% of the maximum intensity value having a duration of 60 ns from which samples can be taken. In order to take two samples then, at a temporal spacing of 50 ns say, a sampling rate of 20 MHz is required. More realistically, to be able to take multiple samples from such a pulse, such as those indicated at 1006, 1008 and 1010 for example, it is desirable to use sampling rates greater than or equal to 50 MHz, 80 MHz or even 100 MHz. Such rates are currently achievable using commercially available technology.

Figure 11:
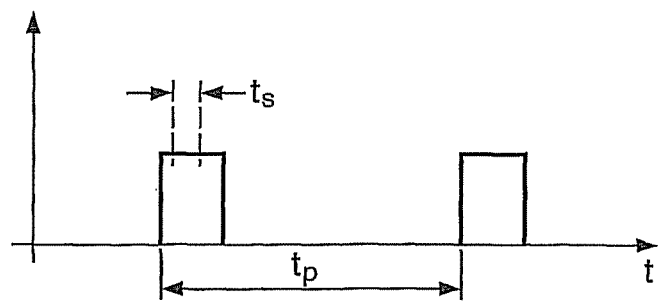

Considering FIG. 11; the time separation between each pulse is $t_p$ and the sampling spacing within the pulse is $\tau_s$. Let the carrier frequency be $\omega_c$ then the single sampling signal $S_1$ obtained at a position 1006 at rate Fp (=$1/t_p$) can be modelled by $$S_1 = A\cos(\omega_c n t_p + \phi_1)$$

where A is the signal amplitude into the demodulation system, n is the nth sample after some arbitrary start, and $\phi_1$ is the phase associated with the sample at the first sampling position $S_1$. The second sample $S_2$ is simply modelled by $$S_2 = A \cos(\omega_c(nt_p + \tau_s) + \phi_2)$$

where $\phi_2$ is the phase associated with the signal at the second sampling position.

It is possible to employ an algorithm using the two samples $S_1$ and $S_2$, to extract the instantaneous phase change $\Delta\phi = (\phi_2 - \phi_1)$ which can take the form:

$$\Delta\varphi = \tan^{-1}\left[\frac{S_2\sqrt{A^2 - S_1^2} - S_1\sqrt{A^2 - S_2^2}}{S_1 S_2 + \sqrt{A^2 - S_1^2}\sqrt{A^2 - S_2^2}}\right]$$

This is the differential phase acquired over the sampling period $\tau_s$ within a pulse. Assuming $\tau_s$ is significantly smaller than the carrier period $t_p$, the change in phase $\Delta\phi$ is small, but this can correspond to a very large instantaneous frequency over the said sampling time.

The above algorithm which operates on two sampling positions on the pulse may provide an adequate solution in certain applications, but has been found to suffer from a degree of data dropout under certain conditions. While a limited amount of data dropout may be acceptable, it is possible to use a third sample $S_3$ (labelled as 1010) from the pulse to improve the estimate of $\Delta\phi$.

By taking a third sample, a second phase change value $\Delta\phi_2$ (corresponding to the phase change over time $\tau_s$ between $S_2$ and $S_3$) is obtained. The difference between the two phase changes $\Delta\phi_1$ and $\Delta\phi_2$ is assumed to be small in comparison to either one value, and by taking the maximum of the absolute value between the two phase measurements i.e. max ($|\Delta\phi_1|$, $|\Delta\phi_2|$) data dropout can be substantially eliminated up to a maximum ratio of $F_s/F_p$ ($F_s = 1/\tau_s$) allowing an accurate reconstruction of a wrapped instantaneous frequency signal. The reconstruction process is typically carried out at the sampling rate $F_p$, but may be decimated to other rates after reconstruction.

Using this technique, signals having instantaneous frequency values up to 500 times greater than the 'normal' overscaling limit can be reconstructed over a wide range of frequencies, for typical sampling frequencies of 160 kHz.

Where the change in phase $\Delta\phi$ is itself wrapped, this will happen between $F_p/2$ and dc, bearing in mind that the centre of the instantaneous frequency change is at the carrier frequency.

A frequency unwrapping algorithm to unfold the instantaneous frequency operates by finding the time positions where the instantaneous frequency reaches zero and changing the sign of the signal between every other pair of zero crossings. The instantaneous frequency is finally integrated or used to reconstruct the lost phase information in the normal sensitive signal.

It will be understood that the present invention has been described above purely by way of example, and modification of detail can be made within the scope of the invention.

Although a fibre optic sensor package suitable for seismic surveying has been described, it will be appreciated by the skilled person that the invention is equally applicable to other types of phase based transducers employed in alternative applications. Examples include uses of fibre optic hydrophones in active sonar systems and measurements of surface vibration using a free space optical interferometer.

Each feature disclosed in the description, and (where appropriate) the claims and drawings may be provided independently or in any appropriate combination.

The invention claimed is:

1. A method of interrogating a phase based transducer, said transducer providing a change in phase of signal propagation in response to a sensed parameter, said method comprising:
    receiving a first signal propagated through said transducer and returned from a point beyond the transducer at a first time, this first signal representing the state of the transducer at the first time,
    receiving a second signal from the same point beyond the transducer at a second time, this second signal representing the state of the transducer at the second time, and
    combining the first and second signals to determine a measure of the rate of change of phase with time of said signal.

2. A method according to claim 1, wherein combining the signal comprises combining a delayed version and an undelayed version of the received signal.

3. A method according to claim 2, wherein the method comprises passing the signal through an output interferometer.

4. A method according to claim 1, wherein combining the signal comprises sampling the signal at a plurality of different times, and comparing said sampled values.

5. A method according to claim 1, further comprising obtaining a value of phase based on said measured rate of change of phase.

6. A method according to claim 5, wherein obtaining a phase value comprises integrating said measured rate of change of phase.

7. A method according to claim 1, further comprising determining a measure of phase from said received signal.

8. A method according to claim 7, wherein said measure of phase and said measure of rate of change of phase are determined substantially simultaneously.

9. A method according to claim 7, comprising obtaining a phase value by combining the said measure of phase from said received signal, and the said measure of rate of change of phase.

10. A method according to claim 1, wherein the signal propagated through the transducer is a pulsed signal.

11. A method according to claim 10, wherein the signal includes at least two pulses having different frequencies.

12. A method according to claim 1, wherein the signal received from the transducer has a carrier frequency, and wherein the magnitude of the peak instantaneous frequency of said signal is greater than or equal to the magnitude of the carrier frequency.

13. A method for interrogating a fibre optic seismic array according to claim 1.

14. A method according to claim 13, for recovering overscaled seismic signals returned from said array.

15. A system for interrogating a phase based transducer, said transducer providing a change in phase of signal propagation in response to a sensed parameter, said system comprising:
    a receiver for receiving a first signal output from said transducer in response to an input signal and returned from a point beyond the transducer at a first time, and for receiving a second output signal from the same point beyond the transducer at a second time,
    and a phase detector including a delay for producing a delayed version of said first and second output signals, and adapted to combine said first and second output signals with said delayed first and second output signals to determine a measure of the rate of change of phase of said first and second output signals.

16. A system according to claim 15, further comprising a signal source for providing first and second input signals to said transducer.

17. A system according to claim 16, wherein said input signals comprise at least two pulses.

18. A system according to claim 17, wherein the delay between said two input pulses is equal to the delay of the phase detector.

19. A system according to claim 15, wherein the phase based transducer is one of a hydrophone, a geophone or an accelerometer.

20. A method for interrogating a phase based transducer, said transducer providing a change in phase of signal propagation in response to a sensed parameter, said method comprising:
   receiving a first output signal from said transducer in response to said input signal and returned from a point beyond the transducer at a first time;
   receiving a second output signal from the same point beyond the transducer at a second time; and
   combining and sampling said received first and second output signals at a plurality of different times and using said samples to determine a measure of the rate of change of phase.

21. A method according to claim 20, wherein said output signal is a pulsed signal, and wherein a plurality of samples are taken from each pulse.

22. A method according to claim 21, wherein at least three samples are taken from each pulse.

23. A method according to claim 21, wherein the duration of a sampled pulse is less than or equal to 200 ns.

24. A method for recovering an overscaled signal returned from a fibre optic phase based sensor, the method comprising the steps of:
   receiving a first signal propagated through said sensor and returned from a point beyond the sensor at a first time;
   receiving a second signal propagated through said sensor and returned from a point beyond the sensor at a second time;
   combining said measurements, and using said combined signal to measure the rate of change of phase of said overscaled signal; and
   using said measure to re-construct the overscaled signal.

25. A method according to claim 24, further comprising measuring the phase of said overscaled signal 26. A method according to claim 25, wherein said measurement of phase and said measurement of rate of change of phase are performed substantially simultaneously.

27. A method according to claim 25, wherein re-constructing the overscaled signal comprises combining said measure of phase and said measure of rate of change of phase.

\* \* \* \* \*